(12) United States Patent
Hertz (10) Patent No.: US 9,655,793 B2
(45) Date of Patent: May 23, 2017

(54) BRAKE RELEASE MECHANISM FOR SURGICAL TABLE

(71) Applicant: Allen Medical Systems, Inc., Batesville, IN (US)

(72) Inventor: Ben Hertz, Acton, MA (US)

(73) Assignee: Allen Medical Systems, Inc., Batesville, IN (US)

( * ) Notice: Subject to any disclaimer, the term of this patent is extended or adjusted under 35 U.S.C. 154(b) by 44 days.

(21) Appl. No.: 14/709,559

(22) Filed: May 12, 2015

(65) Prior Publication Data

US 2016/0296388 A1    Oct. 13, 2016

Related U.S. Application Data (60) Provisional application No. 62/145,270, filed on Apr. 9, 2015.

(51) Int. Cl.
| | |
|---|---|
| *A61G 7/05* | (2006.01) |
| *B60B 33/00* | (2006.01) |
| *A61G 1/02* | (2006.01) |
| *A61G 13/10* | (2006.01) |

(52) U.S. Cl.
CPC ......... *A61G 1/0287* (2013.01); *A61G 1/0237* (2013.01); *A61G 7/05* (2013.01); *A61G 7/0528* (2016.11); *A61G 13/104* (2013.01); *B60B 33/0078* (2013.01)

(58) Field of Classification Search
CPC .......... A61G 2007/0528; A61G 1/0287; A61G 7/018; A61G 7/08; B60B 2200/242; B60B 33/0092; B60B 33/2026; F16D 65/186; F16D 2125/68; F16D 2125/70; F16D 2125/28; F16D 2125/64; F16D 212/14; F16D 212/24
USPC ........................................... 188/1.12, 10, 19
See application file for complete search history.

(56) References Cited

U.S. PATENT DOCUMENTS

| | | |
|---|---|---|
| 1,021,335 A | 3/1912 | Robinson |
| 1,160,451 A | 11/1915 | Sanford |
| 1,372,565 A | 3/1921 | Skelly |
| 1,662,464 A | 3/1928 | McCutchen |
| 1,938,006 A | 12/1933 | Blanchard |
| 2,103,693 A | 12/1937 | Pohl |
| 2,188,592 A | 1/1940 | Cunningham |
| 2,261,297 A | 11/1941 | Seib |
| 2,337,505 A | 12/1942 | Swift |
| 2,452,816 A | 11/1948 | Wagner |
| 2,509,086 A | 5/1950 | Eaton |
| 2,613,371 A | 10/1952 | Keyes |
| 2,636,793 A | 4/1953 | Meyer |
| 2,667,169 A | 1/1954 | Kambourakis |

(Continued)

FOREIGN PATENT DOCUMENTS

| | | | | |
|---|---|---|---|---|
| AU | WO 2005027814 A1 | * | 3/2005 | ............. A61G 7/001 |
| DE | 1162508 B | * | 2/1964 | ............. A61G 7/002 |

(Continued)

*Primary Examiner* — Bradley King
*Assistant Examiner* — Stephen Bowes
(74) *Attorney, Agent, or Firm* — Barnes & Thornburg, LLP (57) ABSTRACT

A surgical patient support includes a foundation frame, a support top, and a brake system. The foundation frame includes a first column and a second column. The support top is coupled to the first column and the second column for rotation about a top axis extending along the length of the support top.

20 Claims, 7 Drawing Sheets

(56) References Cited

U.S. PATENT DOCUMENTS

| | | |
|---|---|---|
| 2,691,979 A | 10/1954 | Watson |
| 2,764,150 A | 9/1956 | Ettinger et al. |
| 2,803,022 A | 8/1957 | Wyhnkoop |
| 2,880,720 A | 4/1959 | Houghtaling |
| 2,935,286 A | 5/1960 | Parsons |
| 3,046,072 A | 7/1962 | Douglas, Jr. et al. |
| 3,049,726 A | 8/1962 | Getz |
| 3,090,381 A | 5/1963 | Watson |
| 3,099,441 A | 7/1963 | Ries |
| 3,188,079 A | 6/1965 | Boetcker et al. |
| 3,238,539 A | 3/1966 | Koch |
| 3,281,141 A | 10/1966 | Smiley et al. |
| 3,286,707 A | 11/1966 | Shafer |
| 3,302,218 A | 2/1967 | Stryker |
| 3,388,700 A | 6/1968 | Mountz |
| 3,428,307 A | 2/1969 | Hunter et al. |
| 3,434,165 A | 3/1969 | Keane |
| 3,584,321 A | 6/1971 | Buchanan |
| 3,599,964 A | 8/1971 | Magni |
| 3,652,851 A | 3/1972 | Zaalberg |
| 3,739,406 A | 6/1973 | Koetter |
| 3,745,996 A | 7/1973 | Rush, Sr. |
| 3,751,028 A | 8/1973 | Scheininger et al. |
| 3,766,384 A | 10/1973 | Anderson |
| 3,795,018 A | 3/1974 | Broaded |
| 3,814,414 A | 6/1974 | Chapa |
| 3,827,089 A | 8/1974 | Grow |
| 3,828,377 A | 8/1974 | Fary, Sr. |
| 3,832,742 A | 9/1974 | Stryker |
| 3,859,982 A | 1/1975 | Dove |
| 3,873,081 A | 3/1975 | Smith |
| 3,890,668 A | 6/1975 | Stosberg et al. |
| 3,895,403 A | 7/1975 | Davis |
| 3,930,548 A | 1/1976 | Wallraff |
| 3,946,452 A | 3/1976 | Eary, Sr. |
| 3,947,686 A | 3/1976 | Cooper et al. |
| 3,949,983 A | 4/1976 | Tommasino |
| 4,018,412 A | 4/1977 | Kees, Jr. et al. |
| 4,054,282 A | 10/1977 | Hamer |
| 4,071,916 A | 2/1978 | Nelson |
| 4,101,120 A | 7/1978 | Seshima |
| 4,108,426 A | 8/1978 | Lindstroem et al. |
| 4,131,802 A | 12/1978 | Braden et al. |
| 4,139,917 A | 2/1979 | Fenwick |
| 4,143,652 A | 3/1979 | Meier et al. |
| 4,144,880 A | 3/1979 | Daniels |
| 4,148,472 A | 4/1979 | Rais et al. |
| 4,175,550 A | 11/1979 | Leininger et al. |
| 4,186,917 A | 2/1980 | Rais et al. |
| 4,205,413 A | 6/1980 | Collignon et al. |
| 4,225,125 A | 9/1980 | Lee |
| 4,239,039 A | 12/1980 | Thompson |
| 4,244,358 A | 1/1981 | Pyers |
| 4,248,445 A | 2/1981 | Vassar |
| 4,257,407 A | 3/1981 | Macchi |
| 4,355,631 A | 10/1982 | LeVahn |
| 4,356,577 A | 11/1982 | Taylor et al. |
| 4,383,351 A | 5/1983 | Fenwick |
| 4,384,378 A | 5/1983 | Getz et al. |
| 4,398,707 A | 8/1983 | Cloward |
| 4,459,712 A | 7/1984 | Pathan |
| 4,474,364 A | 10/1984 | Brendgord |
| 4,484,911 A | 11/1984 | Berlin et al. |
| 4,487,523 A | 12/1984 | Monroe |
| 4,503,844 A | 3/1985 | Siczek |
| 4,506,872 A | 3/1985 | Westerberg et al. |
| 4,526,355 A | 7/1985 | Moore et al. |
| 4,545,571 A | 10/1985 | Chambron |
| 4,552,346 A | 11/1985 | Schnelle et al. |
| 4,579,111 A | 4/1986 | Ledesma |
| 4,583,725 A | 4/1986 | Arnold |
| 4,658,450 A | 4/1987 | Thompson |
| 4,667,365 A | 5/1987 | Martinek |
| 4,671,728 A | 6/1987 | Clark et al. |
| 4,712,781 A | 12/1987 | Watanabe |
| 4,729,535 A | 3/1988 | Frazier et al. |
| 4,730,606 A | 3/1988 | Leininger |
| 4,763,643 A | 8/1988 | Vrzalik |
| 4,769,584 A | 9/1988 | Irigoyen et al. |
| 4,772,880 A | 9/1988 | Goldstein et al. |
| 4,796,846 A | 1/1989 | Meier et al. |
| 4,827,541 A | 5/1989 | Vollman et al. |
| 4,840,362 A | 6/1989 | Bremer et al. |
| 4,840,363 A | 6/1989 | McConnell |
| 4,852,840 A | 8/1989 | Marks |
| 4,856,128 A | 8/1989 | Alsip et al. |
| 4,866,796 A | 9/1989 | Robinson et al. |
| 4,868,937 A | 9/1989 | Connolly |
| 4,872,657 A | 10/1989 | Lussi |
| 4,901,963 A | 2/1990 | Yoder |
| 4,901,964 A | 2/1990 | McConnell |
| 4,923,187 A | 5/1990 | Mombrinie |
| 4,924,537 A | 5/1990 | Alsip et al. |
| 4,937,901 A | 7/1990 | Brennan |
| 4,939,801 A | 7/1990 | Schaal et al. |
| 4,944,054 A | 7/1990 | Bossert |
| 4,947,496 A | 8/1990 | Connolly |
| 4,971,037 A | 11/1990 | Pelta |
| 4,989,848 A | 2/1991 | Monroe |
| 4,998,320 A | 3/1991 | Lange |
| 5,020,170 A | 6/1991 | Ruf |
| 5,088,706 A | 2/1992 | Jackson |
| 5,108,213 A | 4/1992 | Shields |
| 5,121,892 A | 6/1992 | Herzog |
| 5,131,106 A | 7/1992 | Jackson |
| 5,135,210 A | 8/1992 | Michelson |
| 5,152,024 A | 10/1992 | Chrones et al. |
| 5,210,888 A | 5/1993 | Canfield |
| 5,239,716 A | 8/1993 | Fisk |
| 5,276,927 A | 1/1994 | Day |
| 5,287,575 A | 2/1994 | Allen et al. |
| 5,320,444 A | 6/1994 | Bookwalter et al. |
| 5,393,018 A | 2/1995 | Roth et al. |
| 5,400,772 A | 3/1995 | LeVahn et al. |
| 5,404,603 A | 4/1995 | Fukai et al. |
| 5,444,882 A | 8/1995 | Andrews et al. |
| 5,461,740 A | 10/1995 | Pearson |
| 5,483,323 A | 1/1996 | Matsuda et al. |
| 5,502,853 A | 4/1996 | Singleton et al. |
| 5,503,416 A | 4/1996 | Aoki et al. |
| 5,538,215 A | 7/1996 | Hosey |
| 5,588,705 A | 12/1996 | Chang |
| 5,613,254 A | 3/1997 | Clayman et al. |
| 5,626,362 A | 5/1997 | Mottola |
| 5,658,315 A | 8/1997 | Lamb et al. |
| 5,701,991 A | 12/1997 | Helmetsie |
| 5,741,210 A | 4/1998 | Dobrovolny |
| 5,758,374 A | 6/1998 | Ronci |
| 5,778,467 A | 7/1998 | Scott et al. |
| 5,794,286 A | 8/1998 | Scott |
| 5,836,026 A | 11/1998 | Reed |
| 5,836,559 A | 11/1998 | Ronci |
| 5,836,569 A | 3/1999 | Mykytiuk et al. |
| 5,926,871 A | 7/1999 | Howard |
| 5,926,876 A | 7/1999 | Haigh et al. |
| 5,950,259 A | 9/1999 | Boggs |
| 6,003,174 A | 12/1999 | Kantrowitz et al. |
| 6,076,525 A | 6/2000 | Hoffman |
| 6,094,760 A | 8/2000 | Nonaka et al. |
| 6,108,838 A | 8/2000 | Connolly et al. |
| 6,112,349 A | 9/2000 | Connolly |
| 6,120,397 A | 9/2000 | Julian |
| 6,154,901 A | 12/2000 | Carr |
| 6,161,849 A | 12/2000 | Schweninger |
| 6,230,342 B1 | 5/2001 | Haugs |
| 6,260,220 B1 | 7/2001 | Lamb et al. |
| 6,282,736 B1 | 9/2001 | Hand et al. |
| 6,286,164 B1 | 9/2001 | Lamb et al. |
| 6,286,183 B1 | 9/2001 | Stickel et al. |
| 6,295,671 B1 | 10/2001 | Reesby et al. |
| 6,311,349 B1 | 11/2001 | Kazakia et al. |
| 6,320,510 B2 | 11/2001 | Menkedick et al. |
| 6,324,710 B1 | 12/2001 | Hernandez et al. |
| 6,382,576 B1 | 5/2002 | Heimbrock |

(56) References Cited

U.S. PATENT DOCUMENTS

| | | |
|---|---|---|
| 6,385,801 B1 | 5/2002 | Watanabe et al. |
| 6,421,854 B1 | 7/2002 | Heimbrock |
| 6,438,777 B1 | 8/2002 | Bender |
| 6,490,737 B1 | 12/2002 | Mazzei et al. |
| 6,499,158 B1 | 12/2002 | Easterling |
| 6,499,160 B2 | 12/2002 | Hand et al. |
| 6,502,669 B1 | 1/2003 | Harris |
| 6,505,365 B1 | 1/2003 | Hanson et al. |
| 6,523,197 B2 | 2/2003 | Zitzmann |
| 6,526,610 B1 | 3/2003 | Hand et al. |
| 6,584,630 B1 | 7/2003 | Dinkler |
| 6,609,260 B2 | 8/2003 | Hand et al. |
| 6,615,430 B2 | 9/2003 | Heimbrock |
| 6,622,324 B2 | 9/2003 | VanSteenburg et al. |
| 6,622,980 B2 | 9/2003 | Boucher et al. |
| 6,634,043 B2 | 10/2003 | Lamb et al. |
| 6,638,299 B2 | 10/2003 | Cox |
| 6,662,391 B2 | 12/2003 | Wilson et al. |
| 6,663,055 B2 | 12/2003 | Boucher et al. |
| 6,668,965 B2 | 12/2003 | Strong |
| 6,671,904 B2 | 1/2004 | Easterling |
| 6,681,423 B2 | 1/2004 | Zachrisson |
| 6,691,347 B2 | 2/2004 | Hand et al. |
| 6,691,350 B2 | 2/2004 | Weismiller |
| 6,701,553 B1 | 3/2004 | Hand et al. |
| 6,701,554 B2 | 3/2004 | Hembrock |
| 6,721,976 B2 | 4/2004 | Schwaegerle |
| 6,735,794 B1 | 5/2004 | Way et al. |
| 6,754,923 B2 | 6/2004 | Borders et al. |
| 6,813,788 B2 | 11/2004 | Dinkler et al. |
| 6,817,363 B2 | 11/2004 | Biondo et al. |
| 6,859,967 B2 | 3/2005 | Harrison et al. |
| 6,862,759 B2 | 3/2005 | Hand et al. |
| 6,862,761 B2 | 3/2005 | Hand et al. |
| 6,865,775 B2 | 3/2005 | Ganance |
| 6,874,181 B1 | 4/2005 | Connolly et al. |
| 6,886,199 B1 | 5/2005 | Schwaegerle |
| 6,898,811 B2 | 5/2005 | Zucker et al. |
| 6,912,959 B2 | 7/2005 | Kolody et al. |
| 6,928,676 B1 | 8/2005 | Schwaegerle |
| 6,941,951 B2 | 9/2005 | Hubert et al. |
| 6,951,034 B2 | 10/2005 | Shiery et al. |
| 6,966,081 B1 | 11/2005 | Sharps et al. |
| 7,017,228 B2 | 3/2006 | Silverstein et al. |
| 7,020,917 B1 | 4/2006 | Kolody et al. |
| 7,080,422 B2 | 7/2006 | Ben-Levi |
| 7,086,103 B2 | 8/2006 | Barthelt |
| 7,089,884 B2 | 8/2006 | Wang et al. |
| 7,103,932 B1 | 9/2006 | Kandora |
| 7,137,160 B2 | 11/2006 | Hand et al. |
| 7,152,261 B2 | 12/2006 | Jackson |
| 7,159,695 B2 | 1/2007 | Strong |
| 7,197,778 B2 | 4/2007 | Sharps |
| 7,200,894 B2 | 4/2007 | Block et al. |
| 7,216,385 B2 | 5/2007 | Hill |
| 7,234,180 B2 | 6/2007 | Horton et al. |
| 7,290,302 B2 | 11/2007 | Sharps |
| 7,343,635 B2 | 3/2008 | Jackson |
| 7,343,916 B2 | 3/2008 | Biondo et al. |
| 7,496,980 B2 | 3/2009 | Sharps |
| 7,520,007 B2 | 4/2009 | Skripps |
| 7,520,008 B2 | 4/2009 | Wong et al. |
| 7,565,708 B2 | 7/2009 | Jackson |
| 7,600,281 B2 | 10/2009 | Skripps |
| 7,603,731 B2 | 10/2009 | Bradcovich |
| D603,967 S | 11/2009 | Berry et al. |
| 7,669,262 B2 | 3/2010 | Skripps et al. |
| 7,681,269 B2 | 3/2010 | Biggie et al. |
| 7,690,059 B2 | 4/2010 | Lemire et al. |
| 7,694,369 B2 | 4/2010 | Hinders et al. |
| 7,882,583 B2 | 2/2011 | Skripps |
| 8,006,332 B2 | 8/2011 | Lemire et al. |
| 8,060,960 B2 | 11/2011 | Jackson |
| 8,118,029 B2 | 2/2012 | Gneiting et al. |
| 8,196,237 B2 | 6/2012 | Herbst et al. |
| 8,234,730 B2 | 8/2012 | Skripps |
| 8,256,050 B2 | 9/2012 | Wong et al. |
| 8,397,323 B2 | 3/2013 | Skripps et al. |
| 2004/0123389 A1 | 7/2004 | Boucher et al. |
| 2004/0133983 A1 | 7/2004 | Newkirk et al. |
| 2006/0010643 A1 | 1/2006 | Hornbach et al. |
| 2007/0174965 A1 | 8/2007 | Lemire et al. |
| 2008/0000028 A1 | 1/2008 | Lemire et al. |
| 2009/0205139 A1 | 8/2009 | Van Deursen et al. |
| 2009/0288254 A1 | 11/2009 | Herbst |
| 2009/0307844 A1* | 12/2009 | Hornbach ............... A61G 7/00 5/600 |
| 2010/0122430 A1* | 5/2010 | Ahn .................. B60B 33/0021 16/37 |
| 2010/0192300 A1 | 8/2010 | Tannoury et al. |
| 2011/0099716 A1 | 5/2011 | Jackson |
| 2011/0107516 A1 | 5/2011 | Jackson et al. |
| 2011/0119829 A1 | 5/2011 | Skripps et al. |
| 2011/0162141 A1* | 7/2011 | Lemire ................. A61G 7/005 5/510 |
| 2012/0023672 A1 | 2/2012 | Jackson |
| 2013/0269710 A1* | 10/2013 | Hight ................... A61G 13/04 128/845 |

FOREIGN PATENT DOCUMENTS

| | | | |
|---|---|---|---|
| DE | 3438956 A1 | 5/1985 | |
| DE | 4039907 A1 | 7/1991 | |
| DE | 4429062 C2 | 8/2000 | |
| DE | WO 0117476 A1 * | 3/2001 | ............ A61G 7/008 |
| DE | 19723927 C2 | 5/2003 | |
| DE | 10158470 A1 | 6/2003 | |
| DE | 202008001952 U1 | 6/2008 | |
| EP | 617947 B1 | 1/1995 | |
| EP | 1159947 B1 | 9/2006 | |
| FR | 2247194 B1 | 10/1977 | |
| GB | 2210554 B | 9/1989 | |
| JP | 2001112582 A | 4/2001 | |
| WO | WO8500967 A1 | 3/1985 | |
| WO | WO8600221 A1 | 1/1986 | |
| WO | WO9953997 A1 | 10/1999 | |
| WO | WO0062731 A1 | 10/2000 | |
| WO | WO03096958 A1 | 11/2003 | |
| WO | WO2004026212 A1 | 4/2004 | |
| WO | 2006006105 A1 | 1/2006 | |
| WO | WO2009071787 A3 | 8/2009 | |

* cited by examiner

BRAKE RELEASE MECHANISM FOR SURGICAL TABLE

CROSS-REFERENCE TO RELATED APPLICATIONS

The present application claims the benefit, under 35 U.S.C. §119(e), of U.S. Provisional Application No. 62/145,270, which was filed Apr. 9, 2015, and which is hereby incorporated by reference herein in its entirety.

BACKGROUND

The present disclosure relates to patient support apparatuses such as surgical tables. More particularly, the present disclosure relates to wheeled surgical tables having brakes. The present disclosure may also be applicable to other types of patient support apparatuses such as hospital beds, home care beds, x-ray tables, therapy supports, wheel chairs, and the like.

Sometimes, surgical tables have powered brakes. In such designs, redundant non-powered manual brake controls may be desired to allow the brakes to be disengaged in the event of a power outage.

SUMMARY

The present application discloses one or more of the features recited in the appended claims and/or the following features which, alone or in any combination, may comprise patentable subject matter:

According to the present disclosure, a patient support apparatus may include a powered brake system. The powered brake system may include a caster, a brake drive, and a linkage. The caster may include a stem, a wheel coupled to the stem to rotate about an wheel axis relative to the stem, and a braking element movable from a disengaged position allowing rotation of the wheel relative to the stem to an engaged position blocking the wheel from rotation relative to the stem. The brake drive may include a mount and a linear actuator coupled to the mount. The linear actuator may be configured to move from a retracted position to an extended position relative to the mount. The linkage may interconnect the brake drive with the caster.

In some embodiments, the linkage may include a shaft, a release assembly, a disengaging-bias spring, and a locator spring. The shaft may be coupled to the braking element to move the braking element between the disengaged and the engaged positions and may be coupled to the linear actuator to be moved by the linear actuator relative to the mount. The release assembly may be coupled between the shaft and the linear actuator to selectively couple the shaft to the linear actuator. The disengaging-bias spring may be coupled to the shaft to move the shaft so that the braking element is moved from the engaged position to the disengaged position when the shaft is decoupled from the linear actuator. The locator spring may be coupled to the shaft to resist the disengaging-bias spring so that the shaft moves to a preselected position when decoupled from the linear actuator.

In some embodiments, the locator spring may be arranged between a locator collar coupled to the shaft and a first side of the mount. The disengaging-bias spring may be arranged between a disengaging-bias collar coupled to the shaft and a second side of the mount, opposite the first side of the mount.

In some embodiments, the linkage may include a pivot connector coupled to the shaft for movement about a connector axis. The pivot connector may also be coupled to the braking element of the caster to convert linear motion from the linear actuator into rotating motion applied to the braking element.

In some embodiments, the release assembly may include a plate and a handle coupled to the plate. The plate may be movable from a first position in which the plate couples the shaft to the linear actuator for movement therewith to a second position in which the plate releases the shaft from the linear actuator for motion independent of the shaft. The plate may move from the first position to the second position in response to a user moving the handle. The plate may be biased toward the first position. The plate may be coupled to the linear actuator to pivot about a plate axis relative to the linear actuator. The plate may be formed to include a slot that receives a pin coupled to the shaft.

In some embodiments, the plate may be formed to include a hole through which the shaft extends. The hole may have a first section sized to engage the shaft and a second section sized to allow the shaft to slide through the plate.

According to another aspect of the present disclosure, a patient support apparatus includes a brake system. The brake system may include a pair of casters, a brake drive, and a linkage. The pair of casters may each include a stem, a wheel coupled to the stem to rotate about an wheel axis relative to the stem, and a braking element movable from a disengaged position allowing the wheel to rotate relative to the stem to an engaged position blocking the wheel from rotation relative to the stem. The brake drive may include a mount and an actuator coupled to the mount. The actuator may be configured to move from a first position to a second position relative to the mount. The linkage may be coupled to the braking element of each of the casters.

In some embodiments, the linkage may be configured to selectively couple the actuator of the brake drive to the braking element to transfer motion of the actuator to the braking element and to selectively decouple the braking element from the actuator to allow a disengaging-bias spring included in the linkage to move the braking elements from the engaged position to the disengaged position. The linkage may further include a locator spring that resists the disengaging-bias spring so that the braking elements are properly located in the disengaged position when the braking element is decoupled from the actuator.

In some embodiments, the linkage may include a shaft that is selectively coupled to the actuator. The locator spring may be arranged between a locator collar coupled to the shaft and a first side of the mount. The disengaging-bias spring may be arranged between a disengaging-bias collar coupled to the shaft and a second side of the mount, opposite the first side of the mount.

In some embodiments, the linkage may include an actuation member coupled to the actuator for movement therewith, a rod assembly coupled to the braking elements of the casters, and a plate coupled to the actuation member and to the rod assembly. The plate may be coupled to the actuation member to pivot relative to the actuation member about a plate axis.

In some embodiments, the rod assembly may include a shaft slidable along a shaft axis, a first pivot connector coupled to the shaft and to one of the braking elements included in one of the casters, and a second pivot connector coupled to the shaft and to the other of the braking elements included in the other of the casters. The locator spring may receive the shaft and is arranged between a locator collar coupled to the shaft and a first side of the mount. The disengaging-bias spring may receive the shaft and may be arranged between a disengaging-bias collar coupled to the shaft and a second side of the mount, opposite the first side of the mount.

In some embodiments, the rod assembly further includes a pin extending outwardly from the shaft and received in a slot formed in the plate. The shaft may extend through a hole formed in the plate. The actuation member may be a slider coupled to the shaft to slide along the shaft axis relative to the shaft Additional features, which alone or in combination with any other feature(s), such as those listed above and those listed in the claims, may comprise patentable subject matter and will become apparent to those skilled in the art upon consideration of the following detailed description of various embodiments exemplifying the best mode of carrying out the embodiments as presently perceived.

BRIEF DESCRIPTION OF THE DRAWINGS

The detailed description particularly refers to the accompanying figures, in which.

DETAILED DESCRIPTION

Figure 1:
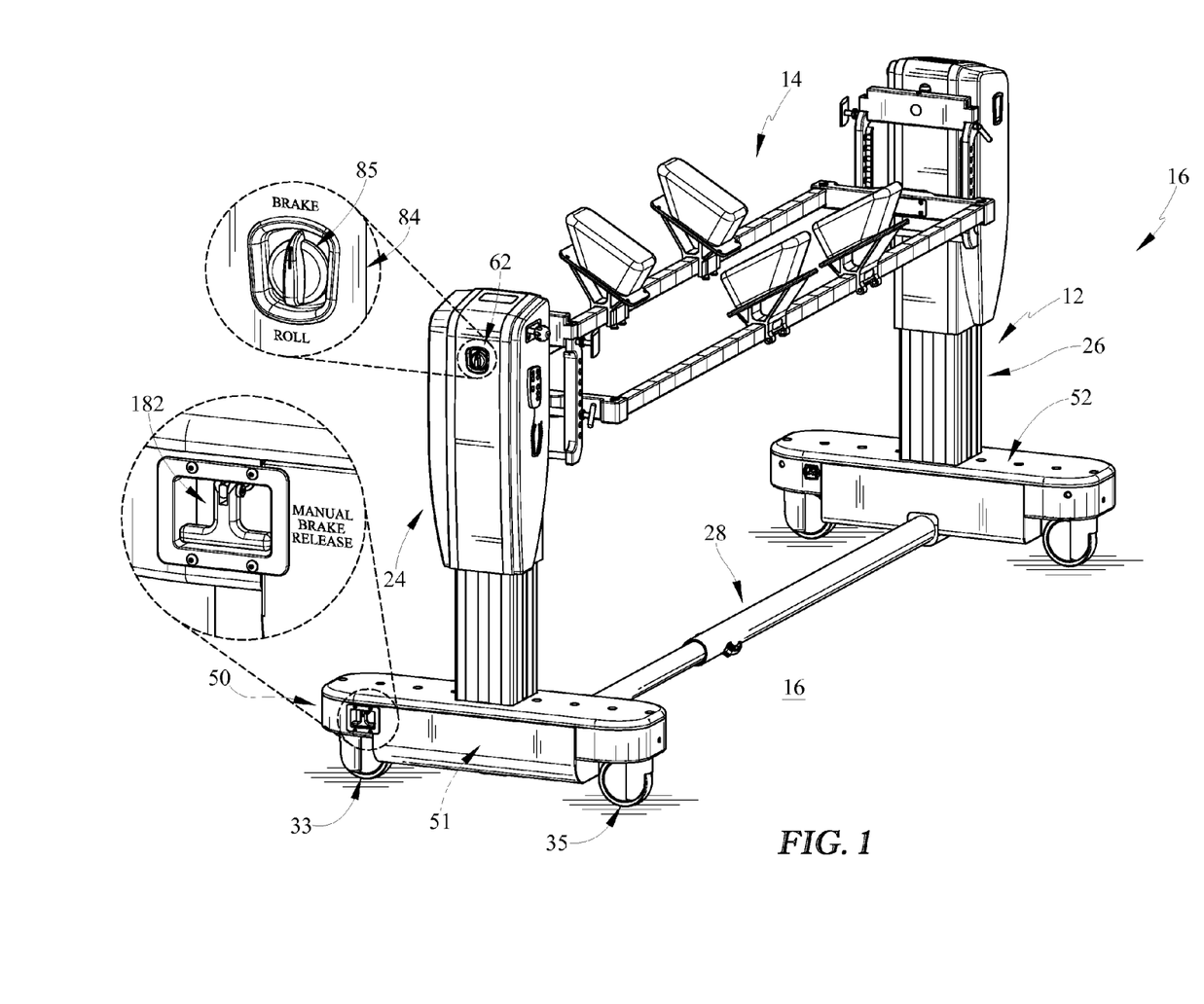
FIG. 1 is a perspective view of a patient support apparatus having a powered brake system with a manual release.

A patient support apparatus 10 for supporting a patient during surgery is shown in FIG. 1. The patient support apparatus 10 illustratively includes a foundation frame 12 and a patient support top 14. The foundation frame 12 rests on a floor 16 and is configured to suspend the support top 14 in a number of different positions above the floor 16. Thus, a patient undergoing surgery can be moved with the support top 14 to a number of different positions and orientations depending on the particular surgical operation to be performed on the patient.

The foundation frame 12 includes a first column 24, a second column 26, an extension 28, and a control system 30 as shown in FIG. 1. Each column 24, 26 of the patient support apparatus 10 includes a pair of casters 33, 35 that engage the floor 16 as shown in FIG. 1. All of the casters 33, 35 are selectively braked or unbraked by a powered brake system 50 to allow the patient support apparatus 10 to roll along the floor 16 to different surgery or storage rooms within a healthcare facility.

Figure 2:
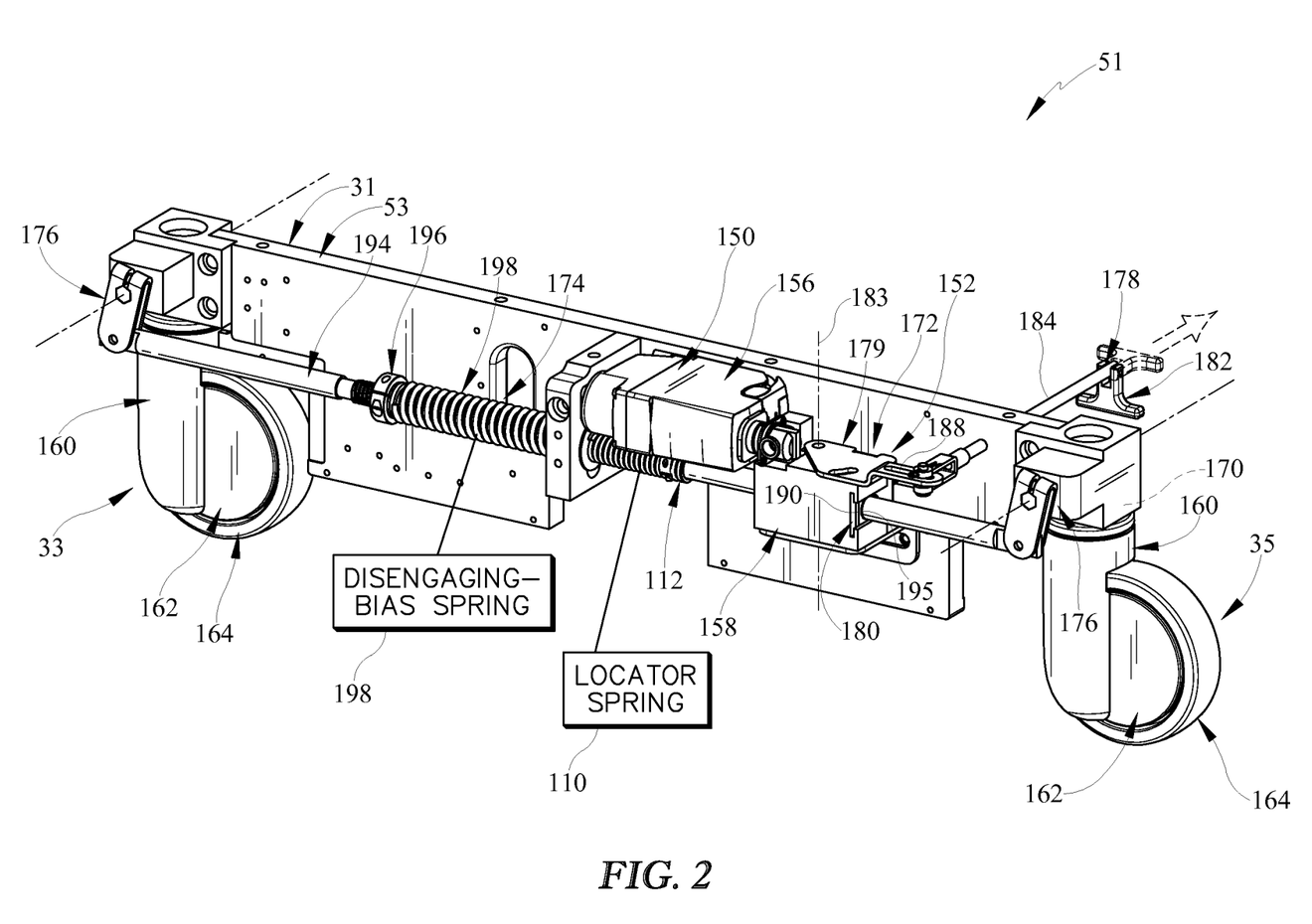
FIG. 2 is a perspective view of one brake mechanism included in the brake system used in the patient support apparatus of FIG. 1.

The powered brake system 50 includes a manual release mechanism as further described below so that the support apparatus 10 may be freed for movement in case of a power failure as suggested in FIG. 1. The manual release mechanism includes a disengaging-bias spring 198 that biases the brake system 50 toward an unbraked condition when manually released as shown in FIG. 2. The release mechanism also includes a locator spring 110 that resists the disengaging-bias spring 198 to prevent overtravel of the brake system 50 past a predetermined unbraked condition as shown in FIG. 2.

Powered operation of the brake system 50 is illustratively controlled by a switch box 62, which includes a housing 84 and a rotary switch 86 received in the housing 84 as shown in FIG. 1. Rotary switch 86 is configured to move between a first position, wherein the brake system 50 is braked, and a second position, wherein the brake system 50 is unbraked. When the brake system 50 is unbraked, the casters 33, 35 are free to roll along the floor 16 in different directions. When the brake system is braked, the casters 33, 35 are blocked from rolling along the floor 16 and are held in a single direction. In some embodiments, the rotary switch is movable to a third position to initiate a brake reset sequence to reset the brake system 50 after the brake system 50 has been manually released as further described below. In other embodiments, one or more membrane switches, pivot switches, or other suitable user inputs may be used to control the brake system 50.

The brake system 50 illustratively includes a head end brake mechanism 51 and a foot-end brake mechanism 52 as suggested in FIG. 1. Each brake mechanism 51, 52 is substantially similar; and, for ease of description, only mechanism 51 is further described herein. However, the following description is equally applicable to brake mechanism 52. Brake mechanism 51 illustratively includes a brake drive 150, a pair of casters 33, 35, and a releasable linkage 152 as shown FIGS. 2 and 3. The brake drive 150 is configured to drive the braking system 50 between a braked configuration and an unbraked configuration in response to a user turning rotary switch 86. The releasable linkage 152 is coupled between the brake drive 150 and the casters 33, 35. The releasable linkage is configured to allow a user to manually free the braking system 50 to move to a released-and-unbraked configuration. The manually achieved released-and-unbraked configuration allows a user to move the patient support apparatus 10 in case of a power failure, an emergency, or an equipment failure.

Figure 3:
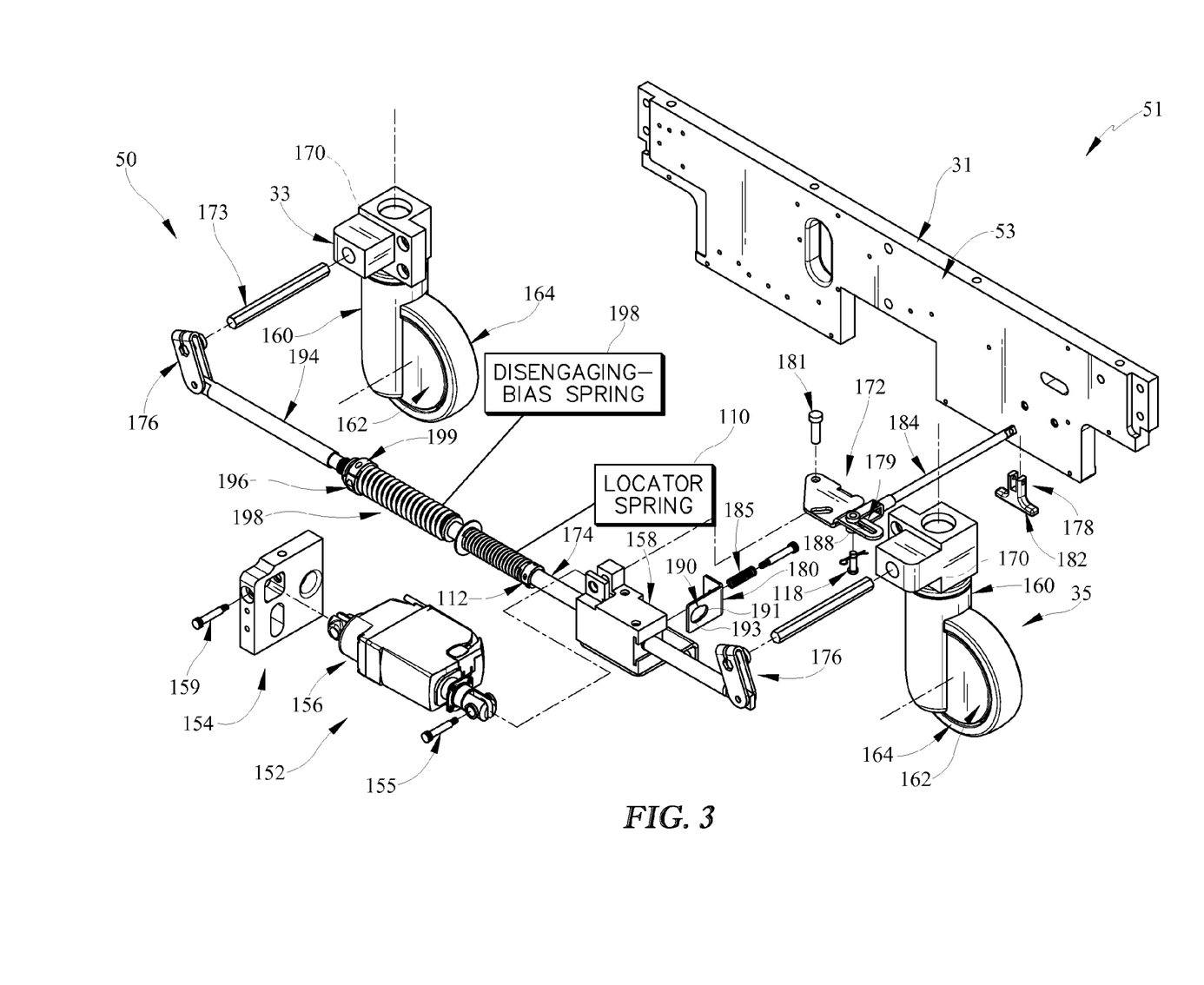
FIG. 3 is an exploded view of the brake mechanism of FIG. 2 showing that the brake mechanism includes a disengaging-bias spring configured to disengage brake elements when the manual release is pulled and a locator spring configured to resist the disengaging bias spring and properly locate the components of the brake mechanism when manually released.

The brake drive 150 includes a mount block 154, a linear actuator 156, and a slider 158 as shown in FIG. 3. The mount block 154 is coupled to a lower plate 53. Mount block 154 supports the linear actuator 156 and the releasable linkage 152. The linear actuator 156 is coupled to the mount block 154 by a bolt 159 and is configured to extend and retract in response to a user input to the switch box 62. The slider 158 is coupled to the releasable linkage 152 and to the linear actuator 156 by a bolt 155.

The casters 33, 35 each include a stem 160, a hub 162, and a wheel 164 as shown in FIG. 2. The stem 160 is coupled to the lower plate 53. The hub 162 and the wheel 164 are coupled to the stem 160 for pivotable movement about a vertical axis 166 so that the caster can change direction relative to the base 31. The wheel 164 is coupled to the hub 162 for rotation about a horizontal axis 168 so that the casters 33, 35 can roll. In the illustrative embodiment, the casters 33, 35 are substantially similar to casters 33, 35 and are each of a type described in U.S. Pat. No. 7,506,404 available from TENTE USA.

Each of the four casters 33, 35 also include a braking element 170 housed inside stem 160 as shown in FIG. 3. The braking element 170 is movable between a disengaged and an engaged configuration. In the disengaged configuration, the braking element 170 allows pivoting of the hub 162 and the wheel 164 about the vertical axis 166 and allows rotation of the wheel 164 about the horizontal axis 168. In the engaged configuration, the braking element 170 blocks pivoting of the hub 162 and the wheel 164 about the vertical axis 166 and blocks rotation of the wheel 164 about the horizontal axis 168, thereby completely immobilizing the casters 33, 35. Unlike the prior art in which only one caster is completely immobilized to provide a steer mode or to resist some movement of a patient support in a brake mode, when the casters 33, 35 of the braking system 50 are driven to the braked configuration, the braking elements 170 of all four casters 33, 35 are engaged to immobilize the casters 33, 35. The immobilization of the casters 33, 35 prevents movement of the patient support apparatus 10 during surgery. To move the braking elements 170 of the casters 33, 35 between the disengaged and the engaged configuration, a dowel 173 extending into the stem 160 is rotated. The dowel 173 has at least one flat side and is hexagonal in the illustrative embodiment.

Figure 4:
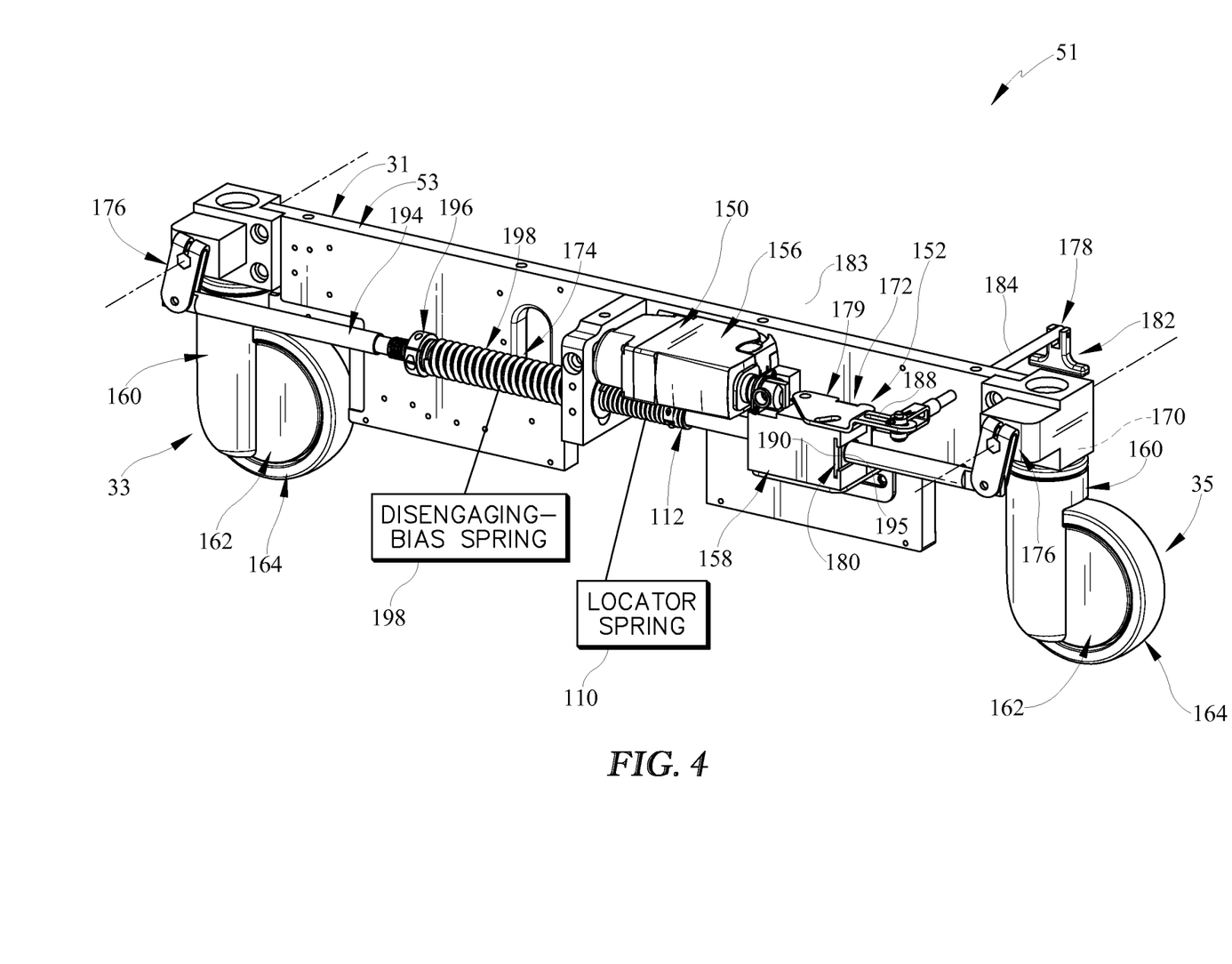
FIG. 4 is a perspective view of brake mechanism of FIGS. 2 and 3 showing the brake mechanism in an unbraked configuration ready for powered movement to the braked configuration as shown in FIG. 5.
Figure 6:
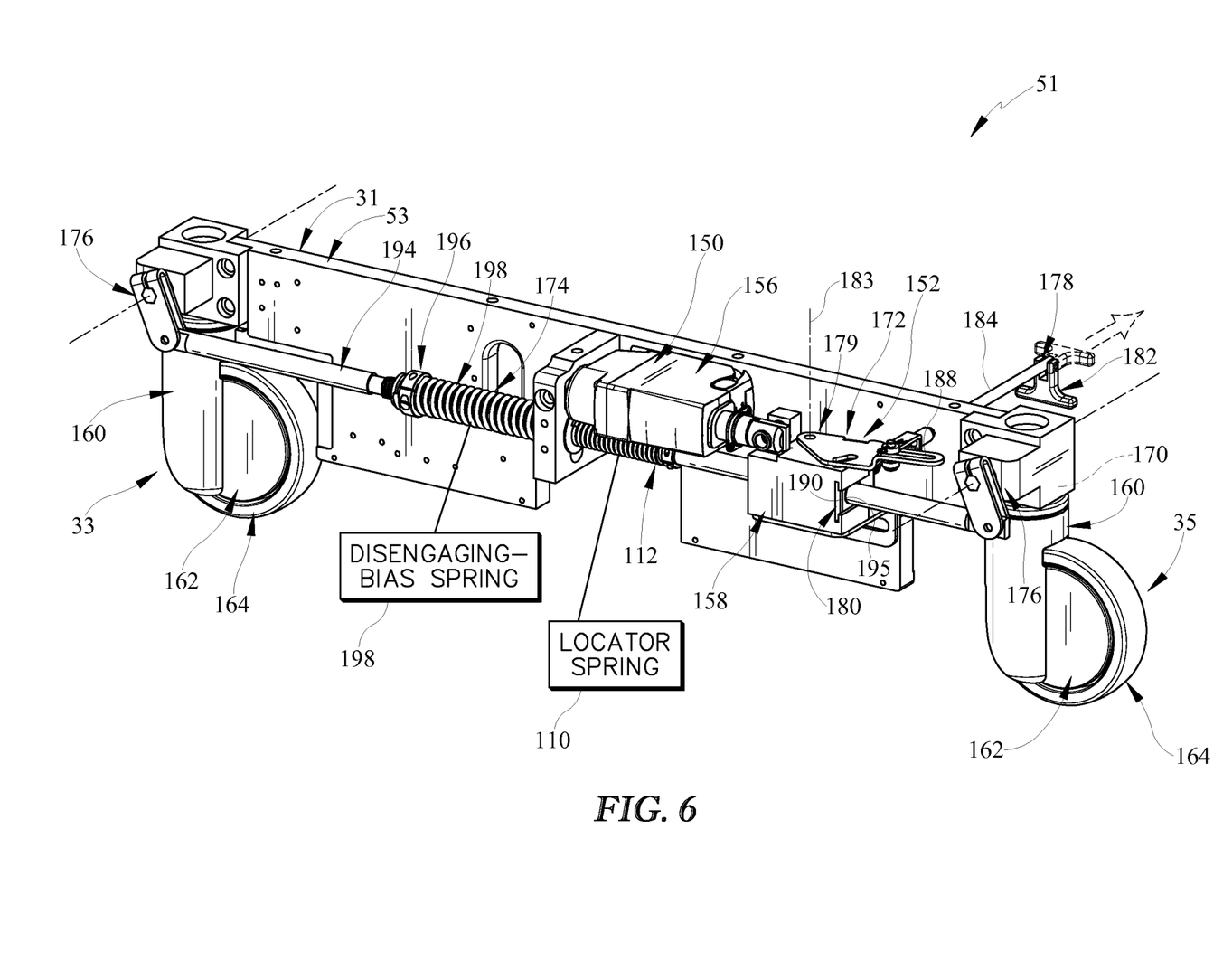
FIG. 6 is a perspective view similar to FIG. 4 showing the brake mechanism in the braked configuration as a user pulls a release handle included in the brake mechanism.

The releasable linkage 152 is configured to convert linear motion from the brake drive 150 into rotation of the dowels 173 so that the braking system 50 is driven between the unbraked and the braked configuration as suggested in FIGS. 3 and 4. The releasable linkage 152 is also configured to manually release the casters 33, 35 from the brake drive 150 and to move the braking elements 170 of the casters 33, 35 from the engaged configuration to the disengaged configuration so that the braking system is in the released-and-unbraked configuration when a user manually releases the linkage 152 as suggested in FIGS. 6 and 7.

The releasable linkage 152 includes a release assembly 172, a rod assembly 174, and a pair of pivot connectors 176 connected at opposing ends of the rod assembly 174 as shown in FIG. 3. The release assembly 172 is coupled to the slider 158 of the brake drive 150 and transfers motion of the brake drive 150 to the rod assembly 174 as shown in FIG. 3. The rod assembly 174 extends through the mount block 154 and along the base 31. The pivot connectors 176 couple the rod assembly 174 to the dowels 173 and are configured to convert linear motion from the linear actuator 156 to rotating motion so that the dowels 173 are turned and the braking elements 170 of the casters 33, 35 are moved between the disengaged and the engaged configurations.

The rod assembly 174 includes a shaft 194, a disengaging-bias collar 196, and a disengaging-bias spring 198 as shown in FIG. 3. The shaft 194 extends through the mount block 154 along the length of the base 31. The disengaging-bias collar 196 extends outwardly from the shaft 194 and is spaced apart from the mount block 154. The disengaging-bias spring 198 is configured to bias the releasable linkage 152 so that the braking system 50 is moved from the braked configuration to the unbraked configuration when the handle 178 is pulled out and the linear actuator 156 of the brake drive 150 is extended.

Figure 7:
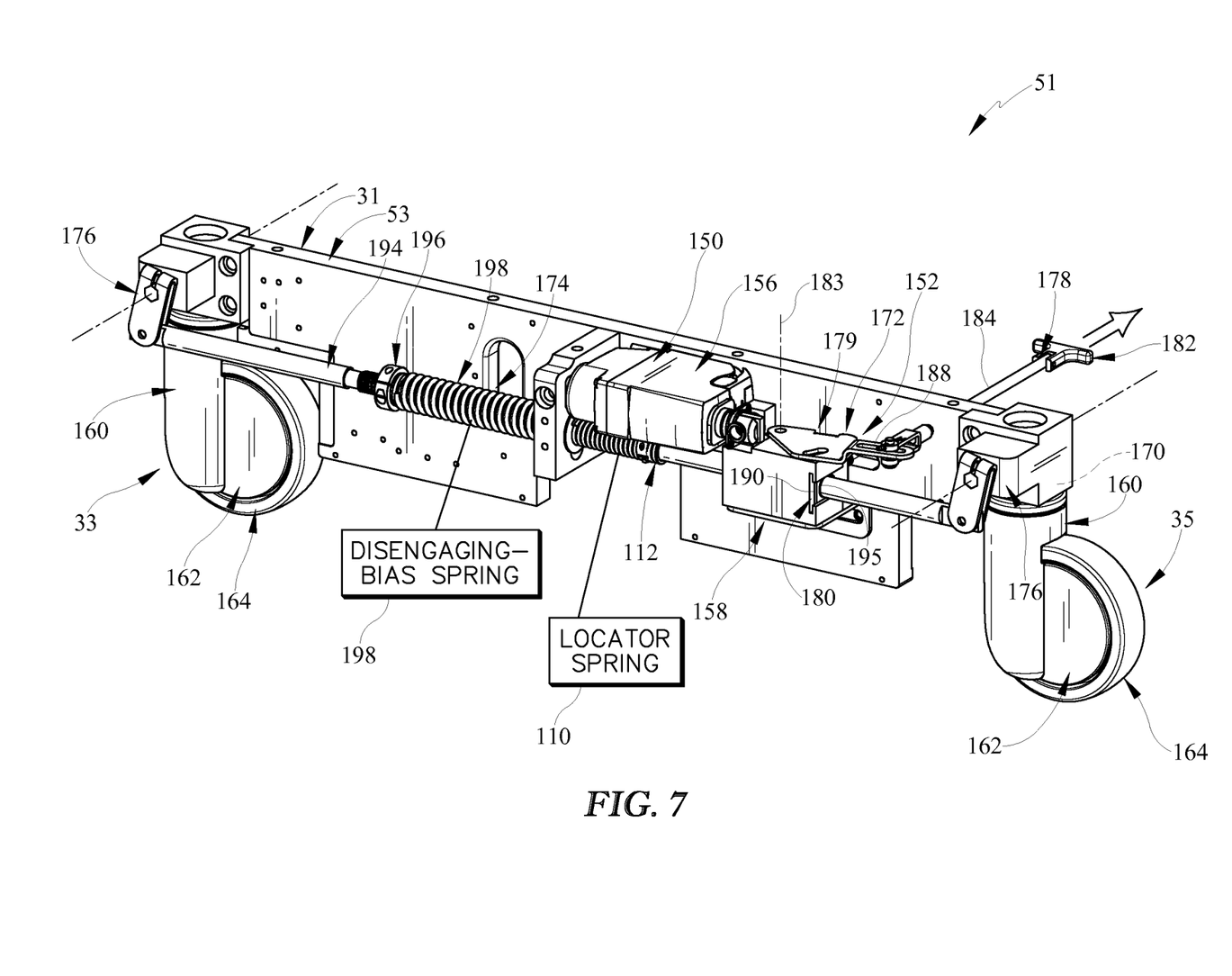
FIG. 7 is a perspective view similar to FIG. 4 showing the brake mechanism returned to the unbraked configuration by a disengaging-bias spring and a locator spring in response to the release handle being pulled.

In the illustrative embodiment, the rod assembly 174 of the linkage 152 also includes a locator spring 110 adapted to resist the disengaging-bias spring 198 so that the shaft 194 moves to a preselected position when disengaged from the linear actuator 156 as suggested in FIG. 7. The locator spring 110 is arranged between a locator collar 112 coupled to the shaft 194 and a first side of the mount 154. Correspondingly, the disengaging-bias spring 198 is arranged between the disengaging-bias collar 196, which is coupled to the shaft 194, and a second side of the mount 154.

The exemplary disengaging-bias spring 198 and the locator spring 110 are compression coil springs that receive the shaft 154 as shown in FIG. 2. However, in other embodiments, the springs 198, 110 may be provided by wave springs, leaf springs, gas springs, or other suitable biasing devices.

The handle 178 includes a grip 182 and a rod 184 as shown in FIG. 7. The grip 182 is a T-shape grip configured to be pulled by a user. The rod 184 extends from the grip 182 to the link member 179.

The link member 179 is coupled to the block 158 for pivotable movement about a link axis 181 as shown in FIG. 3. The link member 179 is also coupled to the plate 180 so that the plate 180 moves between the first and second positions when the link member 179 pivots. The link member 179 is formed to include a rod slot 188 sized to coupled to the rod 184 of the handle 178 by a pin 118 so that the rod 184 can slide along the plate 180 when a user pulls on the grip 182.

The plate 180 is received in a slot 195 formed in the slider 158 and is blocked from being removed by a bolt 199. The plate 190 configured to slide between the first position and the second position when the link member 179 pivots. The plate 180 is formed to include a hole 192 with a first section 191 sized to engage the shaft 194 of the rod assembly 174 and a second section 193 sized to allow the shaft 194 of the rod assembly 174 to slide past the plate 180. The plate 180 is biased to the first position by a spring 185.

Figure 5:
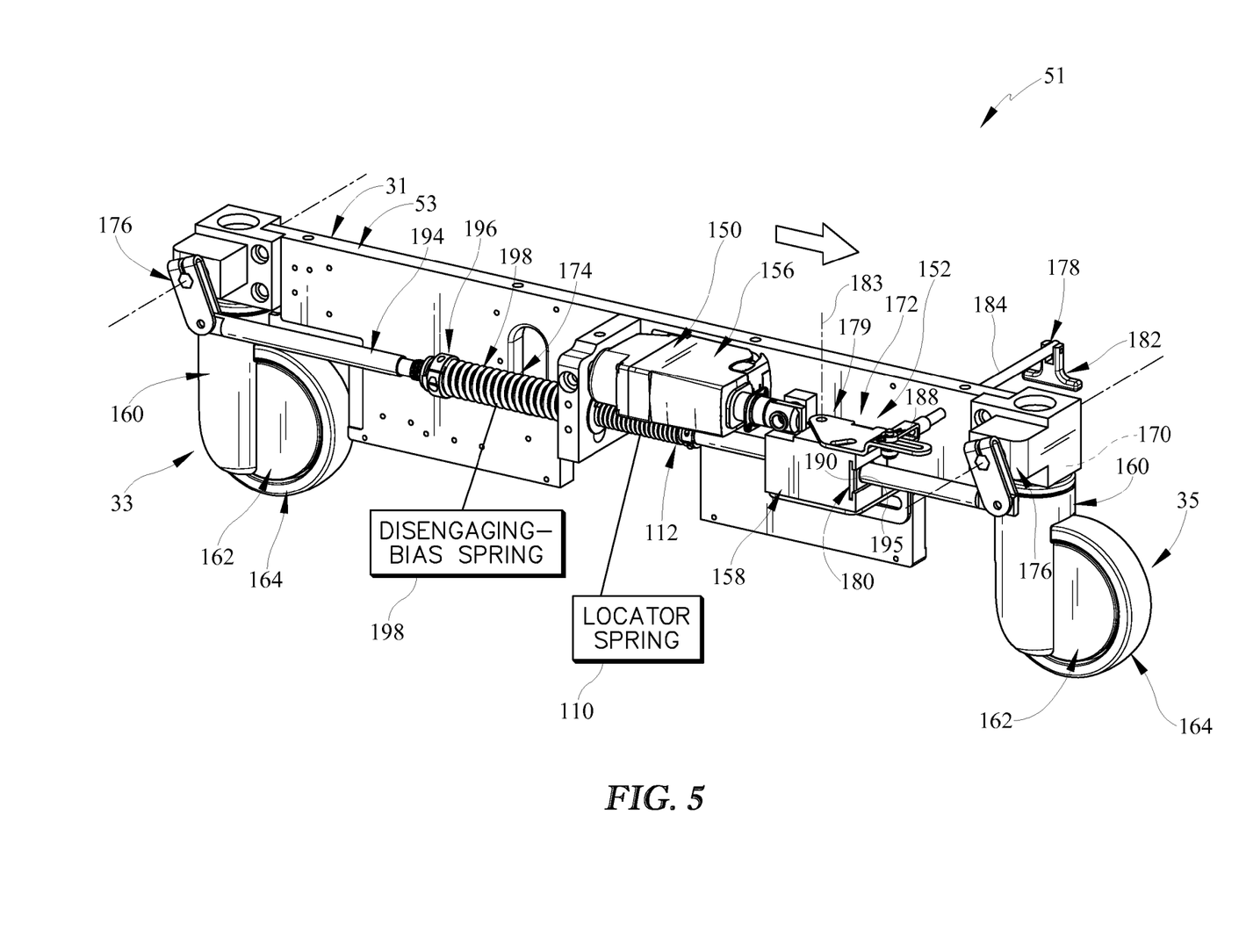
FIG. 5 is a perspective view similar to FIG. 4 showing the brake mechanism moved to the braked configuration by powered operation of the brake system.

In powered operation, the braking system 50 is in the unbraked configuration when the linear actuator 156 is in the retracted position as shown in FIG. 2. In response to a user input to rotary switch 85, the linear actuator 156 is extended as shown in FIGS. 1 and 5. When the linear actuator 156 is extended, the releasable linkage 152 converts the linear motion of the actuator 156 to rotation of the dowels 173 about 30 degrees so that the braking elements 170 are engaged and the casters 33, 35 are moved to the braked configuration. The braking system 50 may be returned to the unbraked configuration by a user operating the remote pendant 60 to retract the linear actuator 156.

To manually release the casters 33, 35 from the brake drive 150 when the brake system is in the braked configuration, a user pulls the grip 182 out as suggested in FIG. 7. In response to the grip 182 being pulled out, the plate 180 pivots about the axis 183 so that the plate 180 is moved to the second position and the shaft 194 of the releasable linkage 152 is free to move relative to the plate 180 and the brake drive 150. When the linkage 152 is free to move relative to the brake drive 150, the biasing disengaging-bias spring 198 moves the shaft 194 of the linkage 152 as shown in FIG. 7 so that the braking elements 170 of the casters 33, 35 are disengaged and the braking system 50 is moved to the released-and-unbraked configuration. The releasable linkage 152 remains free to move relative to the brake drive 150 until the linear actuator 156 is retracted so that the grip 182 is pulled back in, thereby linking the brake drive 150 and the releasable linkage 152 so that the braking system 50 is in the unbraked configuration as shown in FIG. 7.

The foregoing description of various embodiments and principles of the disclosure have been presented for the purposes of illustration and description. It is not intended to be exhaustive or to limit the disclosure to the precise forms disclosed. Many alternatives, modifications and variations will be apparent to those skilled in the art. Moreover, although multiple inventive aspects and principles have been presented, these need not be utilized in combination, and various combinations of inventive aspects and principles are possible in light of the various embodiments provided above. Accordingly, the above description is intended to embrace all possible alternatives, modifications, aspects, combinations, principles, and variations that have been discussed or suggested herein, as well as all others that fall within the principles, spirit and broad scope of the various possible inventions disclosed herein and defined by the claims.

The invention claimed is:

1. A patient support apparatus comprising:
a caster including a stem, a wheel coupled to the stem to rotate about a wheel axis relative to the stem, and a braking element movable from a disengaged position allowing rotation of the wheel relative to the stem to an engaged position blocking the wheel from rotation relative to the stem,
a brake drive including a mount and a linear actuator coupled to the mount, the linear actuator configured to move from a retracted position to an extended position relative to the mount, and
a linkage including a shaft coupled to the braking element to move the braking element between the disengaged and the engaged positions and coupled to the linear actuator to be moved by the linear actuator relative to the mount, a release assembly coupled between the shaft and the linear actuator to selectively engage the shaft with the linear actuator, a disengaging-bias spring coupled to the shaft to move the shaft so that the braking element is moved from the engaged position to the disengaged position when the shaft is disengaged from the linear actuator, and a locator spring coupled to the shaft to resist the disengaging-bias spring so that the shaft moves to a preselected position when disengaged from the linear actuator.

2. The patient support apparatus of claim 1, wherein the locator spring is arranged between a locator collar coupled to the shaft and a first side of the mount.

3. The patient support apparatus of claim 2, wherein the disengaging-bias spring is arranged between a disengaging-bias collar coupled to the shaft and a second side of the mount, opposite the first side of the mount.

4. The patient support apparatus of claim 1, wherein the linkage includes a pivot connector coupled to the shaft for movement about a connector axis and coupled to the braking element of the caster to convert linear motion from the linear actuator into rotating motion applied to the braking element.

5. The patient support apparatus of claim 1, wherein the release assembly includes a plate and a handle coupled to the plate, the plate being movable from a first position in which the plate couples the shaft to the linear actuator for movement therewith to a second position in which the plate releases the shaft from the linear actuator for motion independent of the shaft, and the plate moves from the first position to the second position in response to a user moving the handle.

6. The patient support apparatus of claim 5, wherein the plate is biased toward the first position.

7. The patient support apparatus of claim 5, wherein the plate is coupled to the linear actuator to pivot about a plate axis relative to the linear actuator.

8. The patient support apparatus of claim 5, wherein the plate is formed to include a slot that receives a pin coupled to the shaft.

9. The patient support apparatus of claim 5, wherein the plate is formed to include a hole through which the shaft extends, the hole having a first section sized to engage the shaft and a second section sized to allow the shaft to slide through the plate.

10. A patient support apparatus comprising:
a pair of casters each including a stem, a wheel coupled to the stem to rotate about an wheel axis relative to the stem, and a braking element movable from a disengaged position allowing the wheel to rotate relative to the stem to an engaged position blocking the wheel from rotation relative to the stem,
a brake drive including a mount and an actuator coupled to the mount, the actuator configured to move from a first position to a second position relative to the mount, and
a linkage coupled to the braking element of each of the casters, the linkage configured to selectively engage the actuator of the brake drive with the braking element to transfer motion of the actuator to the braking element and to selectively disengage the braking element from the actuator to allow a disengaging-bias spring included in the linkage to move the braking elements from the engaged position to the disengaged position, wherein the linkage further includes a locator spring that resists the disengaging-bias spring so that the braking elements are properly located in the disengaged position when the braking element is disengaged from the actuator.

11. The patient support apparatus of claim 10, wherein the linkage includes a shaft that is selectively engaged with the actuator and the locator spring is arranged between a locator collar coupled to the shaft and a first side of the mount.

12. The patient support apparatus of claim 11, wherein the disengaging-bias spring is arranged between a disengaging-bias collar coupled to the shaft and a second side of the mount, opposite the first side of the mount.

13. The patient support apparatus of claim 10, wherein the linkage includes an actuation member coupled to the actuator for movement therewith, a rod assembly coupled to the braking elements of the casters, and a plate coupled to the actuation member and to the rod assembly.

14. The patient support apparatus of claim 13, wherein the plate is coupled to the actuation member to pivot relative to the actuation member about a plate axis.

15. The patient support apparatus of claim 13, wherein the rod assembly includes a shaft slidable along a shaft axis, a first pivot connector coupled to the shaft and to one of the braking elements included in one of the casters, and a second pivot connector coupled to the shaft and to the other of the braking elements included in the other of the casters.

16. The patient support apparatus of claim 15, wherein the locator spring receives the shaft and is arranged between a locator collar coupled to the shaft and a first side of the mount.

17. The patient support apparatus of claim 16, wherein the disengaging-bias spring receives the shaft and is arranged between a disengaging-bias collar coupled to the shaft and a second side of the mount, opposite the first side of the mount.

18. The patient support apparatus of claim 15, wherein the rod assembly further includes a pin extending outwardly from the shaft and received in a slot formed in the plate.

19. The patient support apparatus of claim 15, wherein the shaft extends through a hole formed in the plate.

20. The patient support apparatus of claim 15, wherein the actuation member is a slider coupled to the shaft to slide along the shaft axis relative to the shaft.

* * * * *